United States Patent Office 2,890,182
Patented June 9, 1959

2,890,182
METHOD OF INCREASING POT LIFE OF ADHESIVE COMPOSITIONS CONTAINING AN AMYLACEOUS COMPONENT, A PHENOLIC COMPOUND, AND AN ALDEHYDE

David P. Langlois and George C. Pinney, Decatur, Ill., assignors to A. E. Staley Manufacturing Company, Decatur, Ill., a corporation of Delaware No Drawing. Application November 29, 1956
Serial No. 625,197

3 Claims. (Cl. 260—17.2)

This invention relates to improvements in amylaceous adhesives containing an alkaline-curing water-soluble resin-forming material, or the components of such material. These adhesives form water-resistant to water-proof bonds when applied in alkaline condition and dried. They are particularly useful in the manufacture of laminated and corrugated paperboard, paper bags and paper tubes.

This application is a continuation-in-part of our copending application Serial Number 514,100, filed June 8, 1955.

Adhesives of the general type contemplated by this invention are disclosed in United States Patents Nos. 2,529,851 and 2,626,934 and in a copending application filed June 8, 1955, with Serial Number 514,100. The resin-forming materials used with the adhesives disclosed in Patent Number 2,529,851 are ketone-formaldehyde condensation products. Corresponding materials disclosed in Patent Number 2,626,934 are ketone-aldehyde resins, phenol-aldehyde resins and resorcinol-aldehyde resins. These materials are compatible with the alkaline pastes of amylaceous materials such as starch and dextrins, and their addition to the pastes in sufficient proportions, based on the amylaceous component, greatly reduces the tendency of the dried film to soften or rehydrate in contact with water.

Copending application filed June 8, 1955, with Serial Number 514,100, describes an improved method of making water-resistant amylaceous adhesives with the alkaline-curing resin-forming materials. The precursors or components of the resin or water soluble condensation product, as distinguished from the partially condensed preformed resin, are allowed to polymerize in the presence of the pasted amylaceous material. This difference in formulation markedly increases the pot life of the liquid adhesive composition and/or the water resistance of the dried bond.

All of the water resistance agents, whether partially condensed preformed resin or resin components, contemplated by the cited patents and copending application include an aldehyde. For convenience of designation in the following specification and claims, these agents will be referred to collectively as aldehydic water resistance agents, and the adhesives containing them as alkaline-curing aldehydic amylaceous adhesives. All of the water resistance agents under consideration are water-soluble and alkaline-curing. By alkaline-curing is meant the property of polymerizing to higher molecular weight products under alkaline conditions, ultimately yielding water-insoluble products, or copolymerizing with the pasted amylaceous component of the adhesive composition to form reaction pastes which when dried yield films and bonds of increased water resistance.

A disadvantage of the alkaline-curing aldehydic amylaceous adhesive compositions is their limited pot life. Pot life is the length of time, after preparing the adhesive with desired viscosity and other properties, during which the glue properties remain within a range suitable for the use at hand. The glue viscosity gradually increases with age, due to a slow reaction between the water resistance agent and the amylaceous component of the glue. The thickening is often accompanied by an increased "shortness" of the glue, i.e., a congealing or gelling of the fluid composition. Such rheological changes are objectionable, because at first they interfere with the application of the glue and reduce the output and quality of product, and ultimately shut down the manufacturing operation either by failure of the glue machine or failure to meet product specifications.

Operating difficulties due to limited pot life are currently overcome by preparing glue batches small enough to be consumed within the pot life period, and by carefully cleaning the vessels, pumps, pipelines, and glue applicator devices to prevent accumulation of congealed adhesive. Generally speaking, the shorter the pot life the greater the associated labor and inconvenience.

Even though the pot life of the adhesives described in the cited copending application exceeds that of adhesives disclosed in the cited patents, it is still less than desired in certain instances, particularly when the adhesives are used in the manufacture of paper tubes and bags, and laminated paperboard.

We have discovered that the pot life of the alkaline-curing aldehydic amylaceous adhesives can be greatly extended by adding to the completed liquid adhesive composition a small proportion of certain substance reactive with the aldehyde component which do not adversely affect the properties of the adhesive. It is believed that the new reactant competes with the amylaceous material and the non-aldehydic component of the water resistance agent for the aldehyde and thus retards or arrests the polymerization or condensation responsible for the thickening and congealing of the composition.

Accordingly, it is an important object of this invention to increase substantially the pot life of alkaline-curing aldehydic amylaceous adhesives without adversely affecting the properties thereof, by adding thereto at a suitable time a minor amount of an aldehyde-reactive agent. Certain other objects of the invention will, in part, be obvious and will, in part, appear hereinafter.

Any substance which readily reacts in water solution with the aldehyde component of the water resistance agent is effective in this invention. Among the many suitable reagents are ammonia, the lower aliphatic amines, alkali bisulfites, urea, hydroxylamine, hydrazine, phenylhydrazine, and semicarbazide. Ammonia, or equivalent ammonium hydroxide, is preferred because of its alkalinity and low cost.

The amount of added reagent required to produce the maximum viscosity stabilization depends upon the amount of aldehyde component present in excess (on a molar basis) of the other component in the water resistance agent. The other component is typical resorcinol, although it may be a ketone such as acetone or another phenolic compound such as phenol or bisphenol. Maximum stabilization of viscosity is obtained by adding one mol of reagent per mol of excess aldehyde. Useful, but less, stabilization can be obtained by adding less reagent, but adding more than one mol per mol of excess aldehyde is without extra effect. Since the mol ratio of aldehyde to other component (e.g., resorcinol) in the water resistance agent will seldom exceed 2 to 1, the maximum proportion of stabilizing reagent generally required will be about one mol per mol of other component (e.g., resorcinol).

In general any commercial starch or dextrin may be used in the preparation of the adhesives contemplated by this invention. The kind of starch or dextrin used for a particular adhesive will depend upon the nature and type of the adhesive desired. For example, if a low solids content adhesive is desired a thick boiling starch can be used. On the other hand, if a high solids content product is desired dextrin will be employed. Various mixtures of different types of dextrins and/or starch can be formulated by those skilled in the art to meet specific properties and requirements.

The starch or dextrin concentration in any particular adhesive formulation depends upon the specific formulation involved and the type of starch or dextrin used. For example, if a thick boiling native starch is used and all of the starch present is pasted, a maximum of about 10% thereof is all that can be used. However, if some unpasted starch is added, as is the common practice in preparing corrugating adhesives, starch concentrations of 20% or more are possible. Dextrins may be used in concentrations up to about 25%. For any given starch or dextrin, other conditions being the same, increases in the concentration of the starch and/or dextrin increase the copolymerization between the amylaceous component and the water resistant agent.

Referring to the cited copending patent application, the phenolic compound used in the adhesives described in that application include phenol, hydroquinone, resorcinol, pyrocatechol, pyrogallol and bisphenol. The aldehydes employed in the cited copending application include formaldehyde, glyoxal, acetaldehyde, propionaldehyde and furfural. Paraformaldehyde is equivalent to formaldehyde. The preferred water resistant agent is a combination of resorcinol and formaldehyde. On the other hand, combinations of (1) resorcinol and furfural, (2) resorcinol-furfural and formaldehyde, (3) resorcinol and glyoxal, and (4) resorcinol-glyoxal and formaldehyde have all given satisfactory results. As would be expected, the greater the proportion of phenolic and aldehyde reagents that is used, the greater will be the water resistance of the dried bond. Conversely the greater the percentage or starch and/or dextrin used the lower will be the water resistance. If too great a percentage of starch is used, the water resistance will be too low, whereas if too great a percentage of the other reagents is used the adhesive will have a high degree of insolubility and an adhesive value which is too low. Therefore, it is necessary to formulate within certain limits. In this connection it has been found that the phenolic compound may be used in a range of from 2½ to 20% by weight of the starch and/or dextrin with optimum results being obtained with from 5 to 7.5% by weight.

With respect to the aldehyde concentration of the adhesives described in the cited copending application it is more convenient and preferable to state this in the form of a mol ratio to the phenolic compound concentration. Thus it has been found that a mol ratio of aldehyde to resorcinol of greater than 1 to 1 is always required. Preferably this ratio, i.e. $A/P$, is approximately 2 to 1. In some instances the ratio may be as low as 1.3 to 1. For example, with an adhesive made in accordance with the present invention and containing 5% resorcinol based on the weight of the starch, good water resistance can be obtained if the aldehyde-phenolic ratio is 2 to 1. A lower ratio than this will give little water resistance. On the other hand, if 7.5% resorcinol based on the weight of starch is used, an aldehyde-phenolic ratio of 2 to 1 will result in a completely waterproof adhesive while an adhesive of only fair water resistance would be obtained with an aldehyde-phenolic ratio of 1.3 to 1. Higher aldehyde to phenol ratios tend to shorten the pot life of the adhesive and, therefore, this factor must be taken into consideration in preparing a particular composition.

An effective technique for controlling the rate and degree of copolymerization in certain embodiments of the invention, as described in the cited copending application, is to control the temperature used in pasting the starch components. This in turn controls the degree of dispersion of the starch or dextrin and therefore the availability of the hydroxyl group for reaction with the other two components. Starch cooked at 212° F. or higher is therefore much more reactive than starch cooked at lower temperatures. Alkalinity also has a bearing on the degree of pasting of the starch or dextrin since, in general, increases in alkalinity tend to decrease the pasting temperature.

Adhesives described in the cited copending application are improved and their utility is increased by our invention. They are prepared by mixing the starch and/or dextrin and the phenolic compound in water with sufficient alkali to give a slurry having a pH of at least 8.5 and preferably 10 to 11. Such a slurry mixture is heated to 145–165° F. at which temperatures sufficient swelling of the starch occurs to give the desired viscosity to the paste. Complete dispersion of the starch does not occur and is not desired at this time. The temperature of the pasted starch mixture is then lowered to about 100–115° F. and the aldehyde constituent added. Within about one-half to one hour an adhesive composition will be obtained, which when used either for production of solid paperbard or corrugated board, will give a waterproof bond on drying. The reaction in the adhesive composition continues beyond the one-half to one hour period and the viscosity of the adhesive slowly increases as further reaction takes place between the constituents. Addition to the finished adhesive of a small amount of substance reactive with the aldehyde component, as illustrated in the following examples, stabilizes the viscosity of the adhesive and greatly prolongs the adhesive pot life.

The following specific examples are presented to illustrate the nature of the invention and to help indicate its scope. They will inform those skilled in the art as to the best manner of practicing the invention and also suggest alternative procedures coming within the scope of the invention.

EXAMPLE 1

A corrugated paperboard adhesive illustrating the invention was prepared as follows: 100 g. of unmodified cornstarch and 45 g. of resorcinol were mixed with 600 ml. of cold water. After the resorcinol has dissolved, 35 ml. of a 25% aqueous sodium hydroxide solution was stirred into the starch slurry. The mixture was heated to 145–160° F. and held at that temperature for about 10 minutes to paste the starch. Cold water was added to bring the volume to 1,000 ml. In the meantime 500 g. of unmodified cornstarch was slurried in a solution of 25 g. of paraformaldehyde in 1,045 ml. of cold water. The starch paste was stirred into the starch slurry and the temperature of the mixture was adjusted to 110–115° F. After the mixture had aged for about one hour at 110–115°, 10 g. of 28% aqueous ammonia solution was stirred in, and the adhesive composition was ready for use.

Aging of the adhesive prior to adding the stabilizing agent, as described above, is desirable because it develops the maximum water resistance of the dried bond or glue line. Some viscosity increase occurs during the aging period, but it is not enough to be objectionable. The pronounced viscosity stabilizing effect of the ammonia is shown in the following table, listing the viscosities of treated and untreated adhesives at different ages, all aging at 110–115° F. Adhesive No. 1 was prepared according to Example 1 above. Adhesive No. 2 was a control in which the ammonia solution was replaced with an equal volume of water, and No. 3 was another control in which ammonia solution was omitted and nothing added to replace it.

Table 1

| Adhesive | Viscosity in Bauer Funnel Seconds After— | | | | | |
|---|---|---|---|---|---|---|
| | Freshly Prep'd. | 1 Hr. Primary Aging [1] | 2 Hrs. Aging [2] | 4 Hrs. Aging | 8 Hrs. Aging | 24 Hrs. Aging |
| No. 1 | 22 | 24.5 | 25 | 30 | 33 | 37 |
| No. 2 | 22 | 24.5 | 32 | 40 | >90 | >90 |
| No. 3 | 22 | 24.5 | 33 | 42 | >90 | >90 |

[1] Before the ammonia or water is added.
[2] After the ammonia or water is added.
90 seconds is the upper limit of the Bauer funnel reading and the maximum usable viscosity of a corrugating adhesive on a commercial machine.

EXAMPLE 2

An adhesive suitable for solid laminated paperboard was prepared as follows: 100 g. of an alkaline hypochlorite oxidized cornstarch (Brookfield viscosity 1000 cps./20% paste), 25 g. of china clay, 5 g. of resorcinol, and 2 g. of soap (Ivory Snow) were slurried with 300 ml. of cold water. The slurry was heated at 190° F. for 30 minutes to paste the starch, then cooled to about 115° F. Into the cooled paste was stirred 6 ml. of 25% aqueous sodium hydroxide solution and 3 g. of paraformaldehyde. This paste was aged for about one hour at 110–115° F., then mixed with 2 g. of 28% aqueous ammonia solution to stabilize the viscosity. Marked beneficial effect of the ammonia is shown by the viscosity data in Table 2. All aging at 110–115° F.

Table 2

| Adhesive | Brookfield Viscosity in Centipoises After— | | |
|---|---|---|---|
| | 1 Hr. Primary Aging [1] | 6 Hrs. Aging [2] | 96 Hrs. Aging |
| No. 1 | 5,200 | 5,400 | 10,600 |
| No. 2 | 5,200 | >2×10⁶ | >2×10⁶ |
| No. 3 | 5,200 | >2×10⁶ | >2×10⁶ |

Adhesive No. 1—As prepared in Example 2.
Adhesive No. 2—No. 1 with ammonia solution replaced with water.
Adhesive No. 3—No. 1 with ammonia solution omitted and no replacement.
[1] Before the ammonia or water is added.
[2] After the ammonia or water is added.

EXAMPLE 3

A bottom paste for paper bags was made by replacing the oxidized starch in Example 2 with a nequal weight of a white dextrin of medium viscosity and low solubility. Table 3 clearly shows how the viscosity of this paste was stabilized with ammonia.

Table 3

| Adhesive | Brookfield Viscosity in Centipoises After— | | |
|---|---|---|---|
| | 1 Hr. Primary Aging [1] | 6 Hrs. Aging [2] | 96 Hrs. Aging |
| No. 1 | 5,200 | 5,400 | 10,600 |
| No. 2 | 5,200 | >2×10⁶ | >2×10⁶ |
| No. 3 | 5,200 | >2×10⁶ | >2×10⁶ |

[1] Before the ammonia or substitute water is added.
[2] After the ammonia or substitute water is added.
Adhesive No. 1 is Example 3. Adhesive No. 2 is same except that ammonia solution is replaced with water; in Adhesive No. 3, ammonia and its replacement are omitted.

EXAMPLE 4

This example illustrates the application of the invention to a corrugated paperboard adhesive containing a preformed resorcinol-formaldehyde resin as disclosed in United States Patent Number 2,626,934.

One hundred g. of unmodified cornstarch and 45 g. of Penacolite B-16 (Koppers Company brand of resorcinol) were mixed with 600 ml. of cold water and 35 ml. of 25% aqueous sodium hydroxide solution. The mixture was heated to 145–160° F. and held there for about 10 minutes to paste the starch. Cold water was added to bring the volume to 1000 ml. In the meantime 500 g. of unmodified cornstarch was slurried in a solution of 25 g. of paraformaldehyde in 1045 ml of cold water. The starch paste was stirred into the starch slurry and the temperature of the mixture was adjusted to 110–115° F. After the mixture had aged at this temperature for one hour, 10 g. of 28% aqueous ammonia solution was stirred in, and the composition was ready for use.

Table 4

| Adhesive | Bauer Funnel Viscosity in Seconds After— | | | | | |
|---|---|---|---|---|---|---|
| | Freshly Prep'd. | 1 Hr. Primary Aging [1] | 2 Hrs. Aging [2] | 4 Hrs. Aging | 8 Hrs. Aging | 24 Hrs. Aging |
| No. 1, Example 4 | 23 | 24 | 26 | 33 | 42 | 55 |
| No. 2, Example 4 with ammonia replaced with water | 23 | 33 | 88 | >90 | >90 | >90 |
| No. 3, Example 4 with ammonia omitted and no replacement | 23 | 33 | >90 | >90 | >90 | >90 |

[1] Before the ammonia or water is added.
[2] After the ammonia or water is added.

EXAMPLE 5

The ammonia solution in Example 1 was replaced with an equimolar weight of sodium sulfite. This stabilized the viscosity of the adhesive as illustrated in Table 1.

EXAMPLE 6

The ammonia solution in Example 1 was replaced with an equimolar weight of urea. The viscosity of the adhesive composition was stabilized as shown in Table 1.

EXAMPLE 7

Replacing the ammonia solution in Example 1 with an equimolar weight of hydrazine stabilized the adhesive viscosity as shown in Table 1.

EXAMPLE 8

The ammonia solution in Example 1 was replaced with an equimolar weight of hydroxylamine, and again the adhesive viscosity was stabilized as shown in Table 1.

EXAMPLE 9

The ammonia solution in Example 2 was replaced with an equimolar weight of diethylamine. This stabilized the adhesive viscosity as shown in Table 5 below.

Table 5

| Adhesive No. | Brookfield Viscosity in Centipoises After— | | |
|---|---|---|---|
| | 1 Hr. Primary Aging [1] | 6 Hrs. Aging [2] | 24 Hrs. Aging |
| 1 | 5,200 | 5,800 | 6,700 |
| 2 | 5,200 | >2×10⁶ | >2×10⁶ |
| 3 | 5,200 | >2×10⁶ | >2×10⁶ |

Adhesive No. 1—As prepared in Example 9.
Adhesive No. 2—No. 1 in which diethylamine is replaced with water.
Adhesive No. 3—No. 1 with diethylamine omitted and no replacement.
[1] Before the amine or water is added.
[2] After the amine or water is added.

Other lower aliphatic amines such as methyl amine, ethylamine, and the propyl and butyl amines will function as effective aldehyde-reactive agents to stabilize the adhesive viscosity. Also, with reference to Example 5, other alkali metal bisulfites, such as potassium bisulfite, may be used.

Since embodiments of the invention other than those set forth above will be obvious to those skilled in the art without departing from the spirit and scope of our invention, all of the foregoing examples of the invention are intended to be interpreted as illustrative and not in a limiting sense.

What is claimed as new is:

1. The method of increasing the pot life of aqueous alkaline amylaceous adhesive compositions containing (1) and amylaceous component, (2) a phenolic compound selected from the group consisting of phenol, hydroquinone, resorcinol, pyrocatechol, pyrogallol, and bisphenol in an amount 2½% to 20% by weight of said amylaceous component, and (3) an aldehyde selected from the group consisting of formaldehyde, acetaldehyde, propionaldehyde, glyoxal, and furfural, the mol ratio of aldehyde to phenolic compound being 2:1 to 1:1, said compositions having the property of gradually thickening and congealing after being prepared, which comprises preparing the adhesive composition at a desired viscosity and thereafter mixing into the composition an effective and minor proportion based on the weight of said amylaceous component of a substance selected from the group consisting of ammonia, lower aliphatic amines, alkali bisulfites, urea, hydroxylamine, hydrazine, phenyl-hydrazine and semicarbazide to react with any unreacted aldehyde present whereby associated thickening of the liquid composition is retarded.

2. The method of increasing the pot life of liquid amylaceous adhesive compositions having a pH of 8.5-11 and containing (1) a material selected from the group consisting of gelatinized starch and gelatinized dextrin, (2) a phenolic compound selected from the group consisting of phenol, hydroquinone, resorcinol, pyrocatechol, pyrogallol, and bisphenol in an amount 2½% to 20% by weight of said amylaceous component and (3) an aldehyde selected from the group consisting of formaldehyde, acetaldehyde, propionaldehyde, glyoxal, and furfural, the mol ratio of aldehyde to phenolic compound being 1.3:1, said compositions having the property of gradually thickening and congealing after being prepared, which comprises preparing the adhesive composition at a desired viscosity and thereafter mixing into the composition an effective and minor proportion based on the weight of said amylaceous component of a substance selected from the group consisting of ammonia, lower aliphatic amines, alkali bisulfites, urea, hydroxylamine, hydrazine, phenyl-hydrazine and semicarbazide to react with any unreacted aldehyde present whereby associated thickening of the liquid composition is retarded.

3. The method of preparing liquid alkaline amylaceous adhesive compositions containing an aldehyde selected from the group consisting of formaldehyde, acetaldehyde, propionaldehyde, glyoxal and furfural and possessing improved pot life which comprises preparing a mixture of aqueous starch paste, resorcinol in an amount of 2½% to 20% by weight of said starch, alkali, and said aldehyde, the mol ratio of aldehyde to resorcinol being 2:1 to 1:1, aging the mixture to increase the water resistance of a dried film of the mixture, then incorporating with the mixture an effective and minor proportion based on the weight of said amylaceous component of a substance selected from the group consisting of ammonia, lower aliphatic amines, alkali bisulfites, urea, hydroxylamine, hydrazine, phenylhydrazine and semicarbazide to react with any unreacted aldehyde present whereby associated thickening of the liquid composition is retarded.

References Cited in the file of this patent
UNITED STATES PATENTS

| | | |
|---|---|---|
| 2,466,172 | Kesler et al. | Apr. 5, 1949 |
| 2,626,934 | Kesler | Jan. 27, 1953 |
| 2,650,205 | Kesler et al. | Aug. 25, 1953 |

UNITED STATES PATENT OFFICE
CERTIFICATE OF CORRECTION

Patent No. 2,890,182

June 9, 1959

David P. Langlois et al.

It is hereby certified that error appears in the printed specification of the above numbered patent requiring correction and that the said Letters Patent should read as corrected below.

Column 2, line 59, for "typical" read — typically —; column 5, line 50, for "a nequal" read — an equal —; column 6, line 33, for "sulfite" read — bisulfite —; column 7, line 10, for "and" read — an —.

Signed and sealed this 20th day of October 1959.

(SEAL)
Attest:

KARL H. AXLINE

ROBERT C. WATSON
Commissioner of Patents